United States Patent
Stroh et al.

(10) Patent No.: US 11,807,750 B2
(45) Date of Patent: Nov. 7, 2023

(54) COMPOSITIONS WITH INCREASED ELECTRICAL CONDUCTIVITY

(71) Applicant: LYONDELLBASELL ADVANCED POLYMERS INC., Houston, TX (US)

(72) Inventors: John E. Stroh, Sugar Grove, IL (US); Jody D. Riddle, West Chicago, IL (US)

(73) Assignee: LyondellBasell Advanced Polymers Inc., Houston, TX (US)

( * ) Notice: Subject to any disclaimer, the term of this patent is extended or adjusted under 35 U.S.C. 154(b) by 174 days.

(21) Appl. No.: 17/368,278

(22) Filed: Jul. 6, 2021

(65) Prior Publication Data

US 2022/0017737 A1    Jan. 20, 2022

Related U.S. Application Data

(60) Provisional application No. 63/053,425, filed on Jul. 17, 2020.

(51) Int. Cl.
| | | |
|---|---|---|
| *C08L 29/04* | (2006.01) | |
| *H01M 8/0213* | (2016.01) | |
| *H01M 8/0221* | (2016.01) | |
| *H01M 8/0226* | (2016.01) | |

(52) U.S. Cl.
CPC ........... *C08L 29/04* (2013.01); *H01M 8/0213* (2013.01); *H01M 8/0221* (2013.01); *H01M 8/0226* (2013.01); *C08L 2203/20* (2013.01); *C08L 2205/025* (2013.01); *C08L 2205/035* (2013.01); *C08L 2310/00* (2013.01)

(58) Field of Classification Search
CPC ...................................... C08L 29/04
See application file for complete search history.

(56) References Cited

U.S. PATENT DOCUMENTS

| | | | | |
|---|---|---|---|---|
| 4,855,427 | A | * | 8/1989 | Peter ................. C08L 63/10 528/96 |
| 2005/0001352 | A1 | | 1/2005 | Ma et al. |
| 2008/0242768 | A1 | * | 10/2008 | Nishihata ........... H01L 23/293 523/400 |
| 2015/0360956 | A1 | * | 12/2015 | Tour ................... C01B 32/192 423/448 |
| 2017/0226299 | A1 | * | 8/2017 | Arai .................... C08J 5/042 |

FOREIGN PATENT DOCUMENTS

WO    2019028199 A1    2/2019

OTHER PUBLICATIONS

International Search Report and Written Opinion dated Oct. 25, 2021 (dated Oct. 25, 2021) for corresponding PCT/US2021/040509.
Kakati Biraj Kumar et al: "Graphene Reinforced Composite Bipolar Plate For Polymer Electrolyte Membrane Fuel Cell", ASME 2011 9th International Conference On Fuel Cell Science, Engineering and Technology, Jan. 1, 2011 (Jan. 1, 2011), pp. 301-307, XP055848857, Doi: 10.1115/FuelCell2011-54661 ISBN: 978-0-7918-5469-3 Retried from the Internet: URL:http://dx.doi.org/10.1115/FuelCell2011-54661>abstract chapters 2.2 and 3.4.

* cited by examiner

*Primary Examiner* — William D Young

(57) ABSTRACT

Thermoset bulk molding compounds (BMC) useful for making electrically conductive components such as bipolar plates for fuel cells are described. The thermoset bulk molding compounds incorporate graphene nanoplatelets to increase the through-plane electrical conductivity by at least 20% compared to BMCs without the graphene nanoplatelets. Additionally, these compositions have low shrinkage, low density for lightweight parts, and are easily processed. The compositions can be used to prepare a variety of electrically conductive components, including bipolar plates for fuel cells and chemical storage batteries that operate at temperatures of less than 100° C.

13 Claims, No Drawings

COMPOSITIONS WITH INCREASED ELECTRICAL CONDUCTIVITY

This application is the Non-Provisional patent application, which claims benefit of priority to U.S. Provisional Application No. 63/053,425, filed Jul. 17, 2020, the contents of which are incorporated herein by reference in their entirety.

FEDERALLY SPONSORED RESEARCH STATEMENT

Not applicable.

REFERENCE TO MICROFICHE APPENDIX

Not applicable.

FIELD OF THE DISCLOSURE

The disclosure relates to bulk molding compounds, and more particularly, to bulk molding compounds used for electrically conductive components.

BACKGROUND OF THE DISCLOSURE

Electrically conductive materials have a variety of applications in electronics, optoelectronics, sensors, and electrochemical devices. When choosing a manufacturing material for a component or device, it is important to consider not only the electrical properties, including conductivity, but physical and processing properties to ensure the end product functions as intended and is cost-effective to produce.

The importance in balancing the electrical properties with the physical and processing properties is exemplified by bipolar plates in fuel cell stacks. A fuel cell combines hydrogen fuel, typically stored in a pressurized container, with oxygen from the air to produce electricity, heat and water. The fuel cell is similar to a battery in that an electrochemical reaction occurs as long as fuel is available. Because of the absence of combustion, there are no harmful emissions, and the by-product is pure water. As such, fuel cell systems are increasingly being used as a power source in a wide variety of applications. These systems have found use as stationary electric power plants in buildings and residences, back up or emergency power systems, green energy systems, transportation applications and portable power.

Proton exchange membrane (PEM) fuel cells have attracted interest due to their simplicity, high efficiency, reduced weight, fuel flexibility, low operation temperature, and long lifetime. This has allowed for a wide applicability in both portable and stationary applications, especially in transportation and green energy.

One single PEM fuel cell produces less than 1 volt of electricity. To produce useful currents and voltages, individual PEM fuel cells are connected in series to form stacks of cells. Adjacent cells in a stack are separated by bipolar plates, which serve as the anode for one fuel cell and the cathode for the adjacent cell.

The bipolar plate is the heart of the fuel cell stack and is known to significantly impact the performance, durability, and cost of a fuel cell system. In addition to providing mechanical/structural support, the bipolar plate must function as a current collector as well as an impermeable barrier between the gases on either side of the plate. In fact, the United States Department of Energy (DOE) set an electrical conductivity goal for bipolar plates of greater than 100 S/cm by the year 2020. Thus, a bipolar plate should have high electrical conductivity, low permeability to fuel or oxidant fluids, good corrosion resistance, and good structural integrity to improve the performance and durability of the fuel cell stack. Because of these requirements, the bipolar plate, cost-wise, remains the most problematic component for PEM fuel cell stacks and other electrochemical cells.

Many improvements have been made to reduce the costs associated with the bipolar plate while meeting demands for better performance and high conductivity from thinner and lighter stacks. However, it has proved difficult to achieve both a high level of conductivity and desirable physical and processing properties.

Bipolar plates fabricated from metals such as stainless steel are capable of meeting the DOE's electrical conductivity goal. However, metal hardware suffers from high density (higher weight per cell), high cost of forming, machining, and assembly, need for expensive coatings, and possible corrosion in the fuel cell environment which impedes the cost-effective manufacture of thin, lightweight bipolar plates.

Machined graphite plates address the weight and corrosion problems of metals, but graphite is an expensive material that requires high machining cost. The brittle nature of graphite also prevents the use of thin components for reducing stack size and weight, which is particularly important for transportation applications. Further, graphite has been shown to meet the electrical conductivity goals from the DOE, but only in the in-plane direction. For devices such as fuel cells, through-plane conductivity is more important as the electrons are collected by the bipolar plate on the anode side and transported through the bipolar plate to the cathode side. The through-plane electrical conductivity for graphite is about 20 S/cm. As such, machined graphite plates are not able to meet the electrical conductivity goals from the DOE.

Conductive polymer-based composites have been developed as alternatives to metal and graphite materials. A variety of composite bipolar plates have been made, mostly by compression molding of polymer matrices (thermoplastic or thermoset resins) filled with conductive additives such as graphite particles or fibers. These polymer-based composites are advantageous over metallic materials with regard to corrosion resistance and lightweight. they are also lower cost and capable of being molded into thin components. However, most polymers still have extremely low through-plane electrical conductivity with a maximum around 50 S/cm, and are not able to meet the DOE's electrical conductivity goal. While excessive amounts of conductive additives can be incorporated into the resins, this results in an extremely high viscosity of the filled polymer or liquid resin, making it very difficult to process.

While the polymer-based composite materials have many advantages for preparing cost-effective components with the desired strength and size, there still exists a need for further improvements to the polymer-based composites to increase the electrical conductivity without affecting the processability. Ideally, the polymer-based composite materials will have a through-plane electrical conductivity that meets the DOE's goal and find use in electrochemical devices such as fuel cells and chemical flow batteries.

SUMMARY OF THE DISCLOSURE

Described herein are improved vinyl ester-based bulk molded compounds (BMC) with increased through-plane electrical conductivity. In particular, the novel compositions disclosed herein incorporate graphene nanoplatelets into electrically conductive vinyl ester-based BMC thermoset composites to increase the through-plane electrical conductivity by at least 20% compared to similar BMCs without the graphene nanoplatelets.

These novel BMCs are mechanically stable, durable, resistant to oxidation and corrosion, and have a low shrinkage from mold. In some embodiments, these novel compositions have an increased through-plane electrical conductivity while maintaining or improving one or more of the following properties of known conductive vinyl ester-based BMC thermoset compositions: CLTE, low shrinkage, dimensional stability, thermal conductivity, and/or strength. The novel BMC compositions also have an improved compression molding performance and ability to mold a thinner component in addition to having a reduced scrap, reduced defects, and reduced post processing.

In some embodiments of the BMC compositions disclosed herein, the through-plane electrical conductivity is increased by 100% to about 100 S/cm to address the need for a non-metallic material that can be molded into thin, flat, lightweight bipolar plates with low shrinkage, allowing the plates to maintain tight seals in fuel cell stacks. Further, these highly conductive BMCs are also easier to process than other polymeric materials that have been used for bipolar plates. These novel compositions have reduced brittleness, and are easy to fabricate or machine as well as molding net-shaped plates. Thus, the composition can be molded into electrochemical device components that retain the thinness, weight, shrinkage, durability, strength, and moldability of known BMCs while exhibiting electrical conductivity on par with the DOE's goals.

Methods of molding components from the presently disclosed BMCs, including bipolar plates and other electrochemical device components, are also described.

In some embodiments, components formed from the novel BMC compositions are used in applications having an operational temperature of less than 100° C., including electrochemical device applications.

The present disclosure includes any of the following embodiments in any combination(s) of one or more thereof:

A bulk molding compound (BMC) composition having a vinyl ester resin system, a curing package, an additive package, and graphene nanoplatelets in an amount that is greater than 0 to about 2 wt. %, based on the total weight of the BMC composition. This BMC composition has a through-plane electrical conductivity at least 20% greater than the same BMC composition without the graphene nanoplatelets. Alternatively, the through-plane electrical conductivity of this BMC composition is about 100% greater than the same BMC composition without the graphene nanoplatelets.

A bulk molding compound (BMC) composition having a vinyl ester resin system, a curing package, an additive package, and graphene nanoplatelets, wherein the BMC composition has a through-plane electrical conductivity at least 20% greater than the same BMC composition without the graphene nanoplatelets. Alternatively, the through-plane electrical conductivity of the BMC composition is about 100% greater than the same BMC composition without the graphene nanoplatelets.

A bulk molding compound (BMC) composition having a vinyl ester resin system, a curing package, an additive package, and, graphene nanoplatelets, wherein the BMC composition, when molded, has a through-plane electrical conductivity of about 96 to about 110 S/cm.

A bulk molding compound (BMC) composition that has a vinyl ester resin system present in an amount of about 10 to about 30 wt. %, a curing package present in an amount of about 0.05 to about 1.7 wt. %, an additive package present in an amount of about 50 to less than 90 wt. %, and graphene nanoplatelets present in an amount of greater than 0 wt. % to about 5 wt. %, wherein the BMC composition has a through-plane electrical conductivity that is at least 20% greater than the same BMC composition without the graphene nanoplatelets. Alternatively, the through-plane electrical conductivity of the BMC composition is about 100% greater than the same BMC composition without the graphene nanoplatelets.

Any of the above BMC compositions, wherein the vinyl ester resin system comprises at least two vinyl ester resins, a shrinkage control additive, at least one reactive diluent monomer for diluting the at least two vinyl ester resins and the shrinkage control additive, and, optionally, at least one added reactive monomer.

A bulk molding compound (BMC) composition having (a) a vinyl ester resin system, wherein the vinyl ester resin system comprises at least two vinyl ester resins, a shrinkage control additive at least one reactive diluent monomer for diluting the at least two vinyl ester resin and the shrinkage control additive, and optionally, at least one added reactive monomer; (b) a curing package, wherein the curing package comprises at least one initiator; (c) an additive package, wherein the additive package comprises at least one conductive filler, at least one conductive fiber, an internal mold release agent and a thickening agent; and, (d) graphene nanoplatelets present in an amount that is greater than 0 to about 2 wt. %, based on the total weight of the BMC composition. This BMC composition has a through-plane electrical conductivity that is at least 20% greater than the same BMC composition without the graphene nanoplatelets. In some embodiments, this composition has a through-plane electrical conductivity that is 100% greater than the same BMC composition without the graphene nanoplatelets. Alternatively, this composition can have a through-plane electrical conductivity of at least 96 S/cm when molded.

A bulk molding compound (BMC) composition having (a) a vinyl ester resin system, wherein the vinyl ester resin system comprises at least two vinyl ester resins, a shrinkage control additive at least one reactive diluent monomer for diluting the at least two vinyl ester resin and the shrinkage control additive, and optionally, at least one added reactive monomer; (b) a curing package, wherein the curing package comprises at least one initiator; (c) an additive package, wherein the additive package comprises at least one conductive filler, at least one conductive fiber, an internal mold release agent and a thickening agent; and, (d) graphene nanoplatelets, wherein the BMC composition has a through-plane electrical conductivity that is 20% greater than the same BMC composition without the graphene nanoplatelets. In some embodiments, this composition has a through-plane electrical conductivity that is 100% greater than the same BMC composition without the graphene nanoplatelets. Alternatively, this composition can have a through-plane electrical conductivity of at least 96 S/cm when molded.

Any of the above BMC compositions, wherein the at least one added reactive monomer in the vinyl ester resin system is not optional.

Any of the above BMC compositions, wherein the at least one added reactive monomer is present in the vinyl ester resin system and selected from a group consisting of styrene, p-ethylstyrene, α-methylstyrene, vinyl toluene, divinyl benzene, methyl methacrylate, and ethylene glycol diacrylate.

Any of the above BMC compositions, wherein the at least one reactive diluent monomer is selected from a group consisting of styrene, p-ethylstyrene, α-methylstyrene, vinyl toluene, divinyl benzene, methyl methacrylate, and ethylene glycol diacrylate.

Any of the above BMC compositions, wherein the at least one reactive diluent monomer and the at least one added reactive monomer are the same monomer.

Any of the above BMC compositions, wherein the at least one reactive diluent monomer and the at least one added reactive monomer are different monomers.

Any of the above BMC compositions, wherein the at least one added reactive monomer is divinyl benzene and the at least one reactive diluent monomer is styrene.

Any of the above BMC compositions, wherein the at least two vinyl ester resin are bisphenol A epoxy-based vinyl ester resins, and the shrinkage control additive is polyvinyl acetate.

Any of the above BMC compositions, wherein the vinyl ester resin system comprises at least one high viscosity vinyl ester resin and at least one low viscosity vinyl ester resin.

Any of the above BMC compositions, wherein the vinyl ester resins in the vinyl ester resin system have high viscosities.

Any of the above BMC compositions, wherein the vinyl ester resins in the vinyl ester resin system have low viscosities.

Any of the above BMC compositions, wherein the curing package comprises at least one initiator and an optional inhibitor. In some embodiments, the inhibitor is para-benzoquinone. Alternatively, the curing package comprises at least one initiator and at least one inhibitor.

Any of the above BMC compositions, wherein the initiator has a high activation temperature.

Any of the above BMC compositions, wherein the additive package comprises one or more conductive fillers, one or more conductive fibers, an internal mold release agent and an optional thickening agent. In some embodiments, the thickening agent is not optional and is present.

Any of the above BMC compositions, wherein the one or more conductive fillers are graphite powders with a variety of shapes and particle size.

Any of the above BMC compositions, wherein the one or more conductive fillers is a mixture of graphite particles having small particles sizes between 30 and 60 microns and large particle sizes above 120 microns.

Any of the above BMC compositions, wherein the conductive fibers in the additive package comprises at least one milled carbon fiber and at least one chopped carbon fiber.

Any of the above BMC compositions, wherein the additive package has conductive fillers that are graphite powder with a mixture of large and small particle sizes, conductive fibers that are a mixture of milled and chopped carbon fibers, an internal mold release agent that is calcium stearate, and a thickening agent that is methylene diphenyl diisocyanate.

Any of the above BMC compositions, wherein the graphene nanoplatelets are present in an amount that is greater than 0 to about 2 wt. %, based on the total weight of the BMC composition.

Any of the above BMC compositions, wherein the graphene nanoplatelets have an average platelet size between about 1 and about 25 microns, and are present in an amount that is greater than 0 to about 2 wt. %, based on the total weight of the BMC composition.

The present disclosure further comprises components made from any of the above novel graphene nanoplatelet enhanced vinyl ester-based BMC compositions, and methods of making such. In some embodiments, the component may be used as parts for fuels cell that find use in stationary or portable applications, including automotive and chemical flow batteries.

A component made from any of the above BMC compositions, wherein the component is part of an electrochemical cell such as a hydrogen fuel cell, chemical flow battery, or chemical storage battery.

A bipolar plate for use in an electrochemical cell comprising an electrically conductive plate molded from any of the above BMC compositions, wherein the graphene nanoplatelets therein are in an amount effective to provide an electrical conductivity of about 96 to about 110 S/cm for the bipolar plate.

Any of the above components or bipolar plates, wherein the graphene nanoplatelets are present in an amount between greater than 0 and about 2 wt. %, based on the weight of the BMC composition.

Any of the above components or bipolar plates, wherein the graphene nanoplatelets have an average platelet size between about 1 and about 25 microns.

Any of the above components or bipolar plates, wherein the components or bipolar plates have a flexural strength of at least 34 mPa, and a mold shrinkage between about 0.00025 to about 0.00085 in/in.

Any of the above components or bipolar plates, wherein the components or bipolar plates are used in an environment with an operational temperature of less than 100° C.

Any of the above components or bipolar plates, wherein the components or bipolar plates are incorporated into a fuel cell that has an operational temperature of less than 100° C.

A method of making any of the above components or bipolar plates from any of the above BMC composition, comprising (a) mixing the vinyl ester resin system and graphene nanoplatelets at a high shear force to disperse the graphene nanoplatelets in the resin system; (b) adding the curing package and the additive package into the mixture from (a) and mixing at shear forces used for BMC composition; and (c) compression molding the mixture at temperatures of at least 150° C. into the component or bipolar plate.

Although the compositions and methods are described for use in preparing bipolar plates for PEM fuel cells, they can be broadly applicable to other applications requiring electrically conductive materials. The compositions and methods can be used to form components for electrochemical devices that require highly conductive components, such as other hydrogen fuel cells, chemical flow batteries, or chemical storage batteries. Alternatively, the components formed from the compositions and methods described herein can be used in stationary electric power plants in buildings and residences, back up or emergency power systems, green energy systems, transportation applications and portable power.

This summary is provided to introduce a selection of concepts that are further described below in the detailed description. This summary is not intended to identify key or essential features of the claimed subject matter, nor is it intended to be used as an aid in limiting the scope of the claimed subject matter.

DEFINITIONS

The term "monomer" means any compound with a polymerizable moiety. In those instances, in which a polymer is described as comprising one or more monomers, e.g., a polymer comprising propylene and ethylene, the polymer comprises repeat units derived from the monomers, e.g., —CH$_2$—CH$_2$—, and not the monomer itself, e.g., CH$_2$=CH$_2$.

As used herein the term "polymer" means a macromolecular compound prepared by polymerizing monomers of the same or different type. The term "polymer" includes homopolymers, copolymers (including block and random), terpolymers, interpolymers, and so on.

As used herein, the term "polymer composition" refers to a composition made from and/or containing at least one polymer.

The term "resin" is used herein to refer generally to a polymer, polymer precursor material, and/or a mixture or formulation thereof with various additives or chemically reactive components.

As used herein, the term "thermoplastic polymer" means a polymer that softens when exposed to heat and returns to its original condition when cooled to room temperature.

As used herein, the term "thermoset polymer" means a polymer that is irreversibly hardened by curing from a soft solid or viscous liquid prepolymer or resin. A "thermoset resin" can be cured into a thermoset polymer.

The terms "vinyl ester resin" or "vinyl ester" are used interchangeably herein to refer to a composition made by the esterification of an epoxy resin with a monocarboxylic acid. The "vinyl" groups refer to the ester substituents, which are prone to polymerize. Vinyl ester resins are a cross between polyester and epoxy resins as both the price and mechanical properties of vinyl esters fall between those of polyesters and epoxies, but vinyl esters outperform both polyesters and epoxies in toughness (elongation) and corrosion resistance. Depending on the application of the vinyl ester, it can be dissolved in a reactive diluent, such as styrene, during storage or before a molding process.

As used herein, the term "vinyl ester-based" in reference to resins or compositions means the resin or composition has at least one vinyl ester.

As used herein, the term "reactive monomer" refers to substances added to resins that become part of the molding compound during its subsequent curing via copolymerization. A "reactive diluent" is a type of reactive monomer that also serves to dilute or reduce the viscosity of the resin for processing.

As used herein, the term "bulk molding compound" refers to a thermoset resin blend of various inert fillers, fiber reinforcements, catalysts, stabilizers, and optional additives and colorants that form a viscous compound for molding.

As used herein, a "shrinkage control additive" refers to an additive that controls, or even eliminates, shrinkage and/or improves surface smoothness of a part and other properties during the molding or curing process as compared to a part molded from a corresponding compound without the shrink control additive. In the presently disclosed BMCs, the shrinkage control additive is a non-reacting thermoplastic polymer.

As used herein, the term "bipolar plate" refer to a plate used in a fuel cell to uniformly distribute fuel gas, air and coolant, conduct electrical current, remove heat from an active area, and prevent leakage of gases and coolant.

The terms "parts", "articles", and "components" are used interchangeable herein to refer to final or semi-final molded electrically conductive components for use in electronics, optoelectronics, sensors, and electrochemical devices.

As used herein, the term "electrochemical device" refers to a device capable of either generating electrical energy from chemical reactions or using electrical energy to cause chemical reactions. This includes fuel cells, which convert the chemical energy from a fuel into electricity through an electrochemical reaction of hydrogen fuel with oxygen or another oxidizing agent, and chemical storage batteries.

As used herein, the term "room temperature" refers to a temperature around 23 degrees Celsius (unless it is defined differently in an ASTM, in which case "room temperature" means as it is defined within that ASTM for that particular test/procedure/method).

As used herein, the term "weight percent" or "wt. %" is based on the total weight of the final BMC composition, pre-molded and pre-cured, unless otherwise described.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
|---|---|
| BMC | Bulk molding compound |
| CLTE | Coefficient of Linear Thermal Expansion |
| DOE | Department of Energy |
| PBQ | para-benzoguinone |
| PEM | Proton exchange membrane |
| PSI | pound force per sguare inch |
| PVAc | Polyvinyl acetate |
| SCA | Shrinkage control additive |
| StdDev | Standard Deviation |
| wt. % | Weight percent |

TEST METHODS

The components of the compositions disclosed herein, the compositions themselves, and the resulting molded articles were tested and analyzed using one or more of the following test methods:

Density is giving in g/cm$^3$ and measured using ASTM D792-19, which is entitled "Standard Test Methods for Density and Specific Gravity (Relative Density) of Plastics by Displacement." The term "ASTM D792" as used herein refers to the test method published in 2019, the content of which are incorporated herein by reference in its entirety.

Flexural modulus (or "flex modulus") and Flexural strength (or "flex strength") are given in pound force per square inch (PSI) and measured using ASTM D790-17, which is entitled "Standard Test Methods for Flexural Properties of Unreinforced and Reinforced Plastics and Electrical Insulating Materials." The term "ASTM D790" as used herein refers to the test method published in 2017, the content of which are incorporated herein by reference in its entirety.

Compressive strength is given in pound force per square inch (PSI) and measured using ASTM D695-15, which is entitled "Standard Test Method for Compressive Properties of Rigid Plastics." The term "ASTM D695" as used herein refers to the test method published in 2015, the content of which are incorporated herein by reference in its entirety.

Tensile Strength, Tensile Modulus, and Tensile Elongation (or Strain) are given in pound force per square inch (PSI) and measured using ASTM D638-14, which is entitled "Standard Test Method for Tensile Properties of Plastics." The term "ASTM D638" as used herein refers to the test method published in 2014, the content of which are incorporated herein by reference in its entirety.

Compressive strength and tensile strength are different properties. The compressive strength is the capacity of a material to withstand loads tending to reduce size. The tensile strength is the ability of the material to withstands loads tending to elongate or pull apart the specimen.

The notched Izod impact strength measures the impact resistance of materials and is given in ft*lb/in. The standard testing method for notched Izod impact strength is ASTM D256-10, which is entitled "Standard Test Methods for Determining the Izod Pendulum Impact Resistance of Plastics". The term "ASTM D256" as used herein refers to the test method published as the tenth edition in 2018.

The as-molded shrinkage measures the difference between a room temperature mold part to a room temperature mold (RT Mold Part/RT Mold) and is given in inch per linear inch (in/in). The standard testing method for shrinkage is ASTM D955-08, which is entitled "Standard Test Method of Measuring Shrinkage from Mold Dimensions of Thermoplastics." The term "ASTM D955" as used herein refers to the test method published in 2014, the content of which are incorporated herein by reference in its entirety.

The Coefficient of Linear Thermal Expansion (CLTE) measures the ability of the material to expand under the effect of temperature elevation. In the present application, the CLTE was measured by thermal mechanical analysis (TMA) of annealed test specimens cut from compression molded plaques. The mean secant values of the CLTE over the temperature range of −30° C. to 150° C., with a representative temperature of 35° C., are given in (10E-5 mm/mm/° C.). Each data point is measured using ASTM E831-19, which is entitled "Standard Test Method for Linear Thermal Expansion of Solid Materials by Thermomechanical Analysis." The term "ASTM E831" as used herein refers to the test method published in 2019, the content of which are incorporated herein by reference in its entirety.

The thermal conductivity measures the ability of a material to conduct heat and is given in W/m-K. The standard testing method for thermal conductivity is ASTM E1461-13, which is entitled "Standard Test Method for Thermal Diffusivity by the Flash Method". The term "ASTM E1461" as used herein refers to the test method published in 2013.

Unless otherwise noted, measures of electrical conductivity of the materials described here is the through-plane (z direction) electrical conductivity. The through-plane electrical conductivity is given in siemens per centimeter (S/cm) and is measured using the US Fuel Cell Counsel's protocol entitled "Through-plane electrical conductivity testing protocol for composite materials", Document No. 05-160, Jan. 13, 2004. The term "USFCC" as used herein refers to the test method.

For the above-referenced ASTM standards, visit the ASTM website, www.astm.org, or contact ASTM Customer Service at service@astm.org.

DESCRIPTION OF EMBODIMENTS OF THE DISCLOSURE

The present disclosure provides improved electrically conductive thermoset bulk molding compound (BMC) compositions. In particular, the present BMC compositions incorporate graphene nanoplatelets to increase the through-plane electrical conductivity by at least 20% compared to similar BMCs without the graphene nanoplatelets, while retaining or improving the mechanical stability, durability, resistance to oxidation and corrosion, and processability of similar BMCs. Further, the BMCs disclosed herein, when molded, have a flexural strength of at least 34 mPa, and a low shrinkage from mold between about 0.00025 and about 0.00085 in/in. Thus, not only does the incorporation of the graphene nanoplatelets improve the performance of subsequently molded components, but they also increase the applications for the materials.

In more detail, the presently disclosed thermoset compositions are electrically conductive vinyl ester-based BMCs that incorporate graphite nanoplatelets to increase the through-plane electrical conductivity of typical conductive BMC compositions by at least 20%. The addition of graphite nanoplatelets is believed to increase the electrical conductivity because they are small platelets with a high surface area and disperse well in the base polymeric resin. This allows them to enhance the electrically conductive network in the BMC compositions and articles molded therefrom. In some embodiments, BMCs used for bipolar plates and other components of electrochemical devices had a 100% increase in through-plane electrical conductivity by the incorporation of the graphene nanoplatelets. The higher through-plane electrical conductivity increases the applicability of these BMCs without sacrificing other properties such as strength, low shrinkage, and processability.

The BMC thermoset compositions described herein include: (1) a vinyl ester resin system; (2) a curing package; (3) an additive package; and (4) graphene nanoplatelets present in an amount that is greater than 0 to about 2 wt. %, based on the total weight of the BMC thermoset composition. The BMC thermoset compositions can be compression molded into highly conductive components with a variety of shapes and sizes, including thin and intricate components. The BMCs disclosed herein, when molded, have a high conductivity, a low shrinkage from mold and good mechanical and strength properties, as well as being lightweight, making these compositions suitable to the electrochemical cell industry. In some aspects of the present disclosure, the compositions can be molding into bipolar plates with physical and mechanical properties (low shrinkage, density, tensile strength, flexural modulus) and through-plane electrical conductivity that are acceptable to fuel cell manufacturers.

In one aspect of the present disclosure, there are provided BMC compositions comprising:
 (a) a vinyl ester resin system, wherein the vinyl ester resin system comprises
  (i) at least two vinyl esters,
  (ii) a shrinkage control additive; and
  (iii) one or more reactive monomers, wherein at least one reactive monomer is used to dilute one or more vinyl ester and the shrinkage control additive, and
 (b) a curing package, wherein the curing package comprises at least one initiator and an optional inhibitor;
 (c) an additives package, wherein the additives package comprises one or more conductive additives and one or more non-conductive additives; and (d) graphene nanoplatelets, wherein the graphene nanoplatelets have an average platelet size between about 1 to about 25 microns.

In another aspect of the present disclosure, there are provided BMC compositions comprising:
 (a) a vinyl ester resin system, wherein the vinyl ester resin system comprises
  (i) at least two vinyl esters,
  (ii) a shrinkage control additive; and,
  (iii) two or more reactive monomers, wherein at least one reactive monomer is used to dilute one or more vinyl esters and the shrinkage control additive;
 (b) a curing package, wherein the curing package comprises at least one initiator and an optional inhibitor;
 (c) an additives package, wherein the additives package comprises graphite powders, carbon fibers, a thickening agent, and an internal mold release agent; and
 (d) graphene nanoplatelets, wherein the graphene nanoplatelets have an average platelet size between about 1 to about 25 microns.

In another aspect of the present disclosure, there are provided BMC compositions that can be molded into components for use in electrochemical devices that operate at temperatures of less than 100° C. These electrochemical devices can include hydrogen fuel cells and chemical storage batteries.

In yet another aspect of the present disclosure, there are provided components molded from a BMC composition comprising (1) a vinyl ester resin system; (2) curing package; (3) additive package; and (4) graphene nanoplatelets present in an amount that is greater than 0 to about 2 wt. %, based on the total weight of the BMC composition. These components can be used in electrochemical cells.

In another aspect of the present disclosure, there are provided BMC compositions that can be molded into bipolar plates for use in electrochemical devices that operate at temperatures of less than 100° C., such as hydrogen fuel cells and chemical storage batteries.

Another aspect of the disclosure are methods of making a molded component such as bipolar plates for a fuel cell, comprising
 (a) mixing a vinyl ester resin system and graphene nanoplatelets at a high shear force to disperse the graphene nanoplatelets in the resin system;
 (b) adding a curing package and an additive package into the mixture in (a) and mixing at shear forces used for BMC composition;
 (c) compression molding the mixture at temperatures of at least 150° C.

In yet another aspect of the present disclosure, there are provided BMC compositions, or components molded therefrom, that have two or more of the following properties:

Through-plane electrical conductivity that is at least 20% higher than similar BMCs without graphene nanoplatelets, as measured per USFCC Document No. 05-160 (Jan. 13, 2004).

Through-plane electrical conductivity of about 96 to about 110 S/cm or more, as measured per USFCC Document No. 05-160 (Jan. 13, 2004).

Density between about 1.80 and 1.90 g/cm$^3$, as measured by ASTM D792.

The coefficient of linear thermal expansion (CLTE) measures the ability of the material to expand under the effect of temperature elevation. The BMC compositions, or components molded therefrom, can have a CLTE in the z and the x-y plane of about 5 to about 15 ppm, as measured by ASTM E831.

The mold shrinkage measures the difference between a room temperature mold part to a room temperature mold (RT Mold Part/RT Mold). The BMC compositions, or components molded therefrom, can have a mold shrinkage between about 0.00025 to about 0.00085 in/in, as measured by ASTM D955.

The thermal conductivity measures the ability of a material to conduct heat. The BMC compositions, or components molded therefrom, can have an average through plane thermal conductivity between about 10 to about 25 W/m-K, as measured by ASTM E1461.

Tensile properties measure a material's behavior as it is being pulled under controlled tension. The tensile strength is the ability of the material to withstands loads tending to elongate or pull apart the specimen; the tensile modulus is a measure for the stiffness of a material; and the tensile elongation is a measure of the ductility of the material. The BMC compositions, or components molded therefrom, can have an average tensile strength between 4000 and 4500 psi (~27-31 MPa), an average tensile modulus between $2.2 \times 10^6$ and $2.6 \times 10^6$ psi (~15,168-17927 MPa), and an average tensile elongation between about 0.004 to about 0.006 in (~0.1-0.16 mm), all of which are measured by ASTM D638.

Flexural properties measure a material's behavior as it is being flexed, or bent. The flexural strength is the ability of the material to resist deformation under load and the flexural modulus is a measure of the material's resistance to bending. The BMC compositions, or components molded therefrom, can have an average flexural strength of at least 4900 psi (~34 MPa) and an average flexural modulus between $1.9 \times 10^6$ and $2.3 \times 10^6$ psi (~13100-15858 MPa), all of which are measured by ASTM D790.

The compressive strength is the capacity of a material to withstand loads tending to reduce size. The BMC compositions, or components molded therefrom, can have an average compressive strength of at least 7000 psi (~48 MPa) as measured by ASTM D695.

The notched Izod impact strength measures the impact resistance of materials. The BMC compositions, or components molded therefrom, can have an average notched Izod impact of at least 0.3 ft*lb/in, as measured by ASTM D295.

In another aspect, there are provided electrically conductive components of manufacture comprising one or more of the BMC compositions disclosed herein. In some embodiments, the electrically conductive component is part of a fuel cell or chemical storage battery. In some embodiments, the electrically conductive component is a bipolar plate in a fuel cell stack. In some embodiments, such molded components may be used to assist the fuel cell industry in their pursuit of manufacturing lower weight fuel cells for automotive, such that the fuel cell improves fuel efficiency and lower emissions while operating at a higher efficiency than combustion engines. In some embodiments, the molded bipolar plates disclosed herein exhibit a property profile of current BMC compositions, e.g., those used for current non-metallic bipolar plates, except with a through-plane electrical conductivity of about 100 S/cm or more. In some embodiments, the BMC compositions provided herein are compatible with existing tooling and would therefore not require any or only limited retooling expense.

I. Vinyl Ester Resin System

The vinyl ester resin system includes at least two vinyl esters, a shrinkage control additive, at least one reactive monomer that acts as a diluent for the at least two vinyl ester and/or shrinkage control additive, and, optionally, one or more added reactive monomers.

Any thermosetting vinyl ester can be used in the present composition. In some embodiments, high viscosity vinyl ester resin(s) is combined with low viscosity vinyl ester resin(s) to improve the mechanical strengths of the resulting composite. Alternatively, the vinyl ester resin system can be all high viscosity or all low viscosity vinyl ester resins.

The vinyl esters are present in an amount between about 10 and about 30 wt. %, based on the weight of the BMC composition. In some embodiments, the vinyl esters are present in an amount between about 10 and about 15 wt. %, based on the weight of the BMC composition; alternatively, the vinyl esters are present in an amount between about 20 and about 30 wt. %, based on the weight of the BMC composition; alternatively, the vinyl esters are present in an amount between about 12 and about 18 wt. %, based on the weight of the BMC composition; alternatively, the vinyl esters are present in an amount between about 12 and about 15 wt. %, based on the weight of the BMC composition; alternatively, the vinyl esters are present in any amount from about 10 to about 20 wt. %, based on the weight of the BMC composition.

In some embodiments, at least one vinyl ester resin is a bisphenol A epoxy vinyl ester, which is prepared by reacting Bisphenol-A (BPA) epoxy and methacrylic acid. Alternatively, the vinyl ester resin system can employ a bisphenol A epoxy vinyl ester and a novolac epoxy vinyl ester. In other embodiments, the vinyl esters are commercially available from AOC, Ineos, and Polynt.

The vinyl ester resin system further includes a shrinkage control additive (SCA). Shrinkage control additives are widely available and used in BMCs to prevent shrinkage during the molding and cure process. The shrinkage control additive in the present compositions has to be soluble with the vinyl ester resin and the reactive monomers, and can be thermoplastic polyvinyl derivatives such as poly(vinyl toluene) (PVT), poly(vinyl acetate) (PVAc). Alternatively, polystyrene (PS) may be used as the shrinkage control additive. In some embodiments, the shrinkage control additive is polyvinyl acetate.

The amount of shrinkage control additive present in the vinyl ester resin system will depend on the vinyl esters resins and diluent reactive monomer(s). The shrinkage control additive will be present in an amount between greater than 0 to about 7.5 wt. % of the BMC compound. In some embodiments, the shrinkage control additive is present in an amount between greater than 0 to about 5 wt. %, based on the weight of the BMC composition; alternatively, the shrinkage control additive is present in an amount between about 4 and about 7.5 wt. %, based on the weight of the BMC composition; alternatively, the shrinkage control additive is present in an amount between about 3.5 and about 5 wt. %, based on the weight of the BMC composition.

The vinyl ester resin system also includes one or more reactive monomers, which are be present in the vinyl ester resins and shrinkage control additive as a diluent reactive monomer and/or can be added separately in addition to the diluent reactive monomer.

At least one reactive monomer in the vinyl ester resin system is a diluent reactive monomer present in the vinyl ester resins and/or shrinkage control additive to reduce the viscosity of the resins. Diluent reactive monomers include but are not limited to, styrene, p-ethylstyrene, α-methylstyrene, other styrene derivatives, vinyl toluene (VT), divinyl benzene, methyl methacrylate, and ethylene glycol diacrylate. The diluent reactive monomer can comprise about 25 to 35 wt. % of the weight of the vinyl ester resin; alternatively, the diluent reactive monomer can comprise about 25 to about 32 wt. % of the weight of the vinyl ester resin; alternatively, the diluent reactive monomer can comprise about 28 to about 35 wt. % of the weight of the vinyl ester resin; and, alternatively, the diluent reactive monomer can comprise about 30 wt. % of the weight of the vinyl ester resin.

The concentration of the diluent reactive monomer in the shrinkage control additive is higher than the vinyl ester resins and can comprise about 40 to 70 wt. % of the weight of the shrinkage control additive; alternatively, the diluent reactive monomer can comprise about 40 to about 55 wt. % of the weight of the shrinkage control additive; alternatively, the diluent reactive monomer can comprise about 50 to about 70 wt. % of the weight of the shrinkage control additive; alternatively, the diluent reactive monomer can comprise about 60 wt. % of the weight of the shrinkage control additive.

In some embodiments, the diluent reactive monomer is styrene; alternatively, both styrene and divinyl benzene may be present as diluent reactive monomer in the resins and/or shrinkage control additive. In other embodiments, the two or more vinyl ester resins and shrinkage control additive can have the same or different diluent reactive monomer(s). In yet other embodiments, the vinyl ester resin system can combine a high viscosity vinyl esters resin and a shrinkage control additive having a styrene diluent reactive monomer with a low viscosity vinyl esters resin having both a styrene and a divinyl benzene diluent reactive monomer.

In addition to the diluent reactive monomer(s), the vinyl ester resin system may further include optional added reactive monomers. Any known reactive monomer used in BMC can be used in the present composition including styrene, styrene derivatives, divinyl benzene, and vinyl toluene. Divinyl benzene is often added separately to increase the reactivity and crosslinking during the curing process.

The combined amount of both the diluent reactive monomer(s) and added reactive monomer(s) in the vinyl ester resin system is between about 1 and about 15 wt. %, based on the weight of the BMC composition. In some embodiments, the reactive monomers are present in an amount between about 1 and about 8 wt. %, based on the weight of the BMC composition; alternatively, the reactive monomers are present in an amount between about 8 and about 15 wt. %, based on the weight of the BMC composition; alternatively, the reactive monomers are present in an amount between about 5 and about 10 wt. %, based on the weight of the BMC composition; alternatively, the reactive monomers are present in an amount between about 7 and about 11 wt. %, based on the weight of the BMC composition; alternatively, the reactive monomers are present in any amount between about 7 to about 15 wt. %, based on the weight of the BMC composition.

In some embodiments, the vinyl ester resin system combines a high viscosity vinyl ester resin with about 30% styrene as a diluent reactive monomer, a low viscosity vinyl ester resin having both a styrene and a divinyl benzene diluent reactive monomer in a combined amount of about of about 30%, and a shrinkage control additive that is 40% PVAc in styrene as a diluent reactive monomer. Alternatively, the vinyl ester resin systems combines a high viscosity vinyl ester resin with about 30% styrene as a diluent reactive monomer, a low viscosity vinyl ester resin having both a styrene and a divinyl benzene as diluent reactive monomers in a combined about of about 30%, a shrinkage control additive that is 40% PVAc in about 60% styrene as a diluent reactive monomer, and about 0.3 to about 1% of each of styrene and divinyl benzene as added reactive monomers.

II. Curing Package

The presently described BMC compositions are thermosets, which mean they have to be irreversibly cured to form a molded article. To control the curing process, the presently described BMC compositions include a curing package with an initiator to facilitate the curing of the vinyl ester resin system, and an optional inhibitor to prevent premature curing.

The combined amount of the curing package ranges from about 0.05 to about 2.7 wt. % of the BMC compound; alternatively, the curing package is present in an amount between about 0.05 and about 1.7 wt. %, based on the weight of the BMC composition; alternatively, the curing package is present in an amount between about 1.5 and about 2.7 wt. %, based on the weight of the BMC composition; alternatively, the curing package is present in an amount between about 0.1 and about 0.5 wt. %, based on the weight of the BMC composition.

In more detail, vinyl ester resins cure by free radical crosslinking during the molding process. As such, the curing packing comprises at least one initiator, also called a catalyst, to produce a radical species that initiates the curing. These initiators for the presently disclosed compositions can be organic peroxides such as tert-butyl hydroperoxide (TBHP), cumene hydroperoxide (CHP), 2,5-dimethyl-2,5-di(tert-butylperoxy)hexine-3, tert-butyl peroxybenzoate, and tert-butyl peroctoate. Alternatively, other peroxy-type compounds such as peroxyesters, peroxyketals, and peroxydicarbonates, organic periacids, and non-peroxide free radical sources such as azonitrile compounds may also be used. In some embodiments, an initiator with a high activation temperature and is used in combination with a high temperature to increase the cure rate and decrease curing time.

The initiator(s) in the curing package is used in conventional amounts, and is present in an amount between 0.05 and about 2.5 wt. % of the BMC compound; alternatively, the initiator is present in an amount between 0.05 and about 2 wt. % of the BMC compound; alternatively, the initiator is present in an amount between 1 and about 2.5 wt. % of the BMC compound; alternatively, the initiator is present in an amount between 0.3 and about 1.3 wt. % of the BMC compound.

While very rapid cure times can be achieved with the proper combination of an initiator and temperature, the shelf life of catalyzed vinyl ester resins can be quite short—on the order of a few hours. Both longer shelf lives (about 60 days) and rapid cures can be achieved with the use of radical-scavenging inhibitors such as quinones and cresols. Inhibitors can be added to BMC along with the initiator if there is a delay between mixing the BMC and the curing process. At room temperature, inhibitors prevent crosslinking of the components in the resin system by combining with free radicals produced by the gradual decomposition of the initiator. At elevated processing temperatures, increased radical formation quickly consumes any remaining inhibitor and curing occurs. Exemplary inhibitors for use in the present composition include para-benzoquinone (PBQ), hydroquinone, toluhydroquinone, chloranil, or mono-tert-butylhydroquinone. In some embodiments, the inhibitor increases the shelf life of the unmolded compositions to at least 60 days at temperature less than 23° C.

The inhibitor is an optional component that may not be present in the BMC compound, or it may be present in an amount between greater than 0 and about 0.2 wt. % of the BMC compound; alternatively, the inhibitor may be present in an amount between greater than 0 and about 0.1 wt. % of the BMC compound; alternatively, the inhibitor may be present in an amount between 0.05 and about 0.2 wt. % of the BMC compound; alternatively, the inhibitor may be present in an amount between 0.02 and about 0.08 wt. % of the BMC compound.

III. Additive Package

The additive package comprises one or more materials that improve the physical and mechanical properties of vinyl ester resin system, and/or impart electrical conductivity. The additive package includes conductive additives that impart the electrical conductivity to the BMC composition, and/or one or more of fillers, reinforcements, mold release(s), neutralizer(s)/acid scavenger(s), antioxidant(s), lubricants, surfactants, wetting agents, thickening agents, heat stabilizers, defoaming agents, and coupling agents. In some embodiments, the additive package comprises two or more conductive additives, in addition to non-conductive additives. In some embodiments, the additive package comprises at least an internal mold release agent, a thickening agent, a conductive filler, and a conductive reinforcement fiber.

The additives in the additive package may be used in conventional amounts. In some embodiments, the combined amount of the additive package ranges from about 50 to less than 90 wt. % of the BMC compound, depending on the application of the resulting molded component.

In some embodiments, the additive package comprises a mold release agent, or lubricant. Release agents such as waxes and stearates are added to resins to facilitate removal of hardened parts from the mold. These so-called "internal" mold releases can prevent parts from sticking to the mold while avoiding the time- and labor-intensive application of an "external" release agent to the mold surfaces before molding each part. The incorporation of internal mold release agents results in the formation of a lubricious surface layer on the finished part, but does not adversely affect the conductivity of the composite. Any internal mold release agent can be used with the present BMC thermoset composition. In some embodiments, the internal mold release agent is a stearate such as calcium stearate.

The internal mold release agent is present in an amount of about 0.25 to 1.0 wt. % of the BMC compound; alternatively, the internal mold release agent is present in an amount between 0.25 and about 0.65 wt. % of the BMC compound; alternatively, the internal mold release agent is present in an amount between 0.40 and about 1 wt. % of the BMC compound; alternatively, the internal mold release agent is present in an amount between 0.30 and about 0.65 wt. % of the BMC compound.

The additive package further includes one or more conductive additive such as fillers and/or fibers. Commonly used conductive additives include graphite powder, carbon black, and carbon fibers, which form a connected network through the BMC to produce an electrically conductive material. Some of these additives, such as the carbon fiber, can act as reinforcements that impart other properties such as strength and/or flexibility to the BMCs. The conductive additives are present in an amount between 50 and 85 wt. %.

In some embodiments, graphite powder is selected as the conductive additive as it is low cost, low weight, ready availability, and chemical stabile for electrochemical application. In the presently disclosed compositions, the graphite powder has a range of particle sizes between 30 and 600 microns. In other embodiments, graphite powder with a range of particle sizes between 30 and 300 microns is used;

alternatively, graphite powder with a range of particle sizes between 250 and 600 microns is used; alternatively, graphite powder with a range of particle sizes between 100 and 350 microns is used; alternatively, graphite powder with a range of particle sizes between 250 and 400 micron is used. Any shape of the particle such as spherical, elongated, or flaked can be used in the present compositions.

Graphite powders of different particle sizes and particle shapes can be combined in the present compositions. Larger particle sizes impart higher amounts of electrical conductivity but increase resistance to flow. Poor material flow in the compression mold increases defects on the molded component and increases scrap rate. In contrast, smaller particles impart smaller increases in electrical conductivity but increase flowability in the mold. Thus, a combination of small and large particle sizes can be combined to increase electrical conductivity while maintaining an acceptable flow to minimize defects.

An upper limit on the amount of graphite powder is determined by the need to provide enough of the vinyl ester resin system to maintain the integrity of the molded component. In some embodiments, this upper limit of graphite is about 85 wt. % of the BMC composition. For components such as bipolar plates that require high conductivity, the graphite powder loading may be between about 60-80 wt. % and the vinyl ester resin system may be between 8-15 wt. % of the BMC composition. For other fuel cell design or components for other electrochemical devices, the graphite powder loading may be between about 25 to about 85 wt. % and the vinyl ester resin system may be between 5 and about 20 wt. % of the BMC composition. In other embodiments, the amount of graphite powder is between about 25 to about 85 wt. % of the BMC composition; alternatively, the amount of graphite powder is between about 60 to about 80 wt. % of the BMC composition; alternatively, the amount of graphite powder is between about 60 to about 75 wt. % of the BMC composition; alternatively, the amount of graphite powder is between about 65 to about 75 wt. % of the BMC composition.

In addition to the graphite powder, the present compositions may also include optional electrically conductive fibers. In some embodiments, the electrically conductive fibers are short carbon "microfibers" (<12 mm) to attain good fill and provide a relatively homogenous structure, while acting as a reinforcement fiber. Further, the electrically conductive fibers can be milled or chopped. Carbon fibers may be used in some embodiments as they have high stiffness, high tensile strength, low weight, high chemical resistance, high-temperature tolerance and low thermal expansion.

The amount of electrically conductive fiber will depend on the total amount of conductive additives, but when present, it is in an amount between about greater than 0 to about 10 wt. % of the BMC composition. Alternatively, the amount of electrically conductive fiber is between greater than 0 to about 6 wt. % of the BMC composition; alternatively, the amount of electrically conductive fiber is between about 3 to about 10 wt. % of the BMC composition; alternatively, the amount of electrically conductive fiber is between about 1 to about 3 wt. % of the BMC composition.

In some embodiments, the additive package further comprises a thickening agent. When polymeric compositions are molded by compression molding, the polymeric composition has to be thickened. As vinyl esters do not have a terminal carboxyl groups in its molecule, the thickening agent can be metal oxides, metal hydroxides or an isocyanate material that can react and form covalent bonds with alcohol groups (R—OH) on the vinyl esters. The isocyanate material can be monoisocyanates or polyisocyanates. In some embodiments, the isocyanate material is a diisocyanate such as methylene diphenyl diisocyanate (MDI), toluene diisocyanate (TDI), hexamethylene diisocyanate (HDI), and isophorone diisocyanate (IPDI). In other embodiments, the selected diisocyanate is diluted in the same diluent reactive monomer as the vinyl ester resins and/or shrinkage control additive, such as styrene.

The thickening agent is an optional component, but when utilized, is present in an amount of about greater than 0.0 to about 4.0 wt. % of the BMC compound; alternatively, the thickening agent is present in an amount between greater than 0.0 and about 3.25 wt. % of the BMC compound; alternatively, the thickening agent may be present in an amount between 2 and about 4 wt. % of the BMC compound; alternatively, the thickening agent may be present in an amount between 1.5 and about 3 wt. % of the BMC compound.

In some embodiments, the additives in the additive package are added individually (or in combination) to the BMC composition directly, while the composition is being blended such that the additives are distributed approximately evenly throughout the composition. In some embodiments, the additive package is added into the composition before the curing package, after the curing package or with the curing package.

IV. Graphite Nanoplatelets

The presently disclose BMC thermoset compositions also incorporate graphene nanoplatelets to increase the electrical conductivity above that which is imparted by the conductive additives.

The graphene nanoplatelets are present in an amount between greater than 0 and about 5 wt. %, based on the weight of the BMC composition. In some embodiments, the graphene nanoplatelets are present in an amount between greater than 0 and about 2.5 wt. %; alternatively, the graphene nanoplatelets are present in an amount between about 0.5 and about 2 wt. %; alternatively, the graphene nanoplatelets are present in an amount between about 0.75 and about 1.5 wt. %; alternatively, the graphene nanoplatelets are present in an amount between about 1.0 and about 1.25 wt. %.

While other particles in the BMC composition range from 30 to about 600 microns, the average platelet size of the graphene nanoplatelets used therein ranges from about 1 to about 25 microns. In some embodiments, the average platelet size of the graphene nanoplatelets is between about 1 to about 12 microns; alternatively, the average platelet size of the graphene nanoplatelets is between about 10 to about 25 microns; alternatively, the average platelet size of the graphene nanoplatelets is between about 5 to about 10 microns. In other embodiments, the average platelet size of the graphene nanoplatelets is about 1, 5, 10, 15, 20 or 25 microns.

These nanoplatelets are manufactured as small stacks of graphene that are 1 to 15 nanometers thick, with diameters ranging from sub-micrometer to 100 micrometers. Thus, they have to be broken up or dispersed during the mixing process using high shear forces. In some embodiments, the graphene nanoplatelets are combined and mixed at high shear forces with each vinyl ester resins separately, or with the vinyl ester resin system as a whole. Then, the shear force is reduced as the curing and additive packages are added therein and mixed.

V. Mixing/Molding

Each component in the presently described BMC composition is mixed together before the molding and curing process. In some embodiments, a liquid component is formulated first by combining the curing package and any liquid additives (such as mold release agents) with the graphene nanoplatelet-dispersed vinyl ester resin system and mixing thoroughly. The pre-blended solids (graphite powder, carbon fibers, carbon black) are then mixed into the formulated liquid resin, followed by the thickening agent, to form a homogeneous compound with a paste-like consistency. This homogeneous compound is then molded and cured.

Alternatively, the graphene nanoplatelets can be added to the vinyl ester resin system first and mixed under high shear forces to properly disperse the nanoplatelets. Then, the curing package and any liquid additives can be added to the vinyl ester system and thoroughly mixed at smaller shear forces. The pre-blended solids (graphite powder, carbon fibers, carbon black) are then mixed into the formulated liquid resin to form the homogeneous compound that will be molded and cured.

The presently disclosed compositions can be compression molded and cured using known methods. The molds can incorporate design features such as flow channels therein or these features can be later machined into the molded part. In some embodiments, the compositions are compression molded and cured at elevated temperature at about 150° C. and above to increase radical formation and, subsequently, the rate of curing.

The graphene nanoplatelets increases the through-plane electrical conductivity of the molded components by at least 20%, compared to similar compositions without the graphene nanoplatelets and molded in the same manner. This increase in through-plane electrical conductivity allows the molded part to find use in a wide variety of applications requiring electrically conductive materials, including electrochemical devices. In some embodiments, the molded composition has a through-plane electrical conductivity is about 100 S/cm, allowing it to be molded into thin, lightweight bipolar plates for fuel cells and chemical flow batteries. Other components for the applications are also possible.

EXAMPLE

The following example is included to demonstrate embodiments of the appended claims using the above described compositions. The example is intended to be illustrative, and not to unduly limit the scope of the appended claims. Those of skill in the art should appreciate that many changes can be made in the specific embodiments which are disclosed and still obtain a like or similar result without departing from the spirit and scope of the disclosure herein. In no way should the following example be read to limit, or to define, the scope of the appended claims.

This example demonstrates the increased through-plane electrical conductivity resulting from the addition of graphene nanoplates to a BMC thermoset. The formulations for the composition and it's comparative (no graphene nanoplates) composition are shown in Table 1, and the weight percentages were calculated using the total weight of each composition.

Materials. The BMC compound formulation for Comparative Composition 1 includes: (1) two vinyl ester resins (Resin A and Resin B); (2) two reactive monomers; (3) an additive package with conductive additives, and (4) a curing package. Composition 1 has the same base formulation as Comparative Composition 1 except Graphene A was added to the two vinyl ester resins before the remaining components.

Resin A is a bisphenol A epoxy-based vinyl ester resin that was dissolved in one of the reactive monomers, styrene. In particular, Resin A has a styrene content of 27% and a specific gravity of 1.1. This resin is used in applications requiring outstanding mechanical properties and resistance to chemicals and heat.

Resin B is an epoxy-based vinyl ester resin that was also dissolved in two reactive diluent monomers, styrene and divinyl benzene. In particular, Resin B has a reactive diluent monomer content of 30% and a specific gravity of 1.1. Similar to Resin A, this resin is used in applications requiring outstanding mechanical properties and resistance to chemicals and heat.

Resin A has a higher viscosity than Resin B, and is able to react with the thickening agent to form a dry, non-sticky and handleable material before molding. Resin B was selected to improve the composite's mechanical strength.

Both Resin A and B are used in manufacturing bipolar plates for fuel cells. For Composition 1, these resins also included the addition of Graphene A. Graphene A is nanoplatelets with an average thickness of 15 nm and an average particle size of 15 microns. The nanoplatelets are manufactured in stacks which are broken up by high shear mixing of Graphene A with each vinyl ester resin before the addition of the other ingredients in the base formulations.

The shrinkage control additive for both Comparative Composition 1 and Composition 1 was a 40% polyvinyl acetate in styrene.

The compositions in Table 1 also include two added reactive monomers: styrene and divinyl benzene. This amount of both added reactive monomers is in addition to the amounts used as reactive diluent monomers in Resin A and B, and the shrinkage control agent.

In the compositions below, the additive package includes a diisocyanate thickening agent that reacts with Resin A and an internal mold release agent. The additive package further included two different types of carbon fibers and a mix of three graphite powders to impart electrical conductivity. Graphite powder A is a synthetic graphite with a large particle size (about 150 microns) and an elongated shape that provides for higher electrical conductivities and resistance to flow in the mold. Graphite powder B is a smaller particle (about 50 microns) with a flaked shaped which reduces electrical conductivity but increases flow in the mold. Graphite powder C is a synthetic graphite with a small particle (about 40 microns) size to increase flow in the mold. Carbon Fiber A is a milled fiber reinforcement and Carbon Fiber B is a chopped fiber reinforcement with a 0.125 inch (3.175 mm) chop length.

The curing package includes an inhibitor (5% PBQ in styrene and acetone) and an initiator with a high activation temperature.

TABLE 1

| | Compositions | | |
|---|---|---|---|
| Category | Raw Material | Comparative Comp. 1 | Comp. 1 |
| Resin | Resin A (wt. %) | 4.675 | |
| Resin | Resin B (wt. %) | 9.184 | |

TABLE 1-continued

Compositions

| Category | Raw Material | Comparative Comp. 1 | Comp. 1 |
|---|---|---|---|
| Resin | Resin A with 3% Graphene A (wt. %) | | 4.675 |
| Resin | Resin B with 9.6% Graphene A (wt. %) | | 9.184 |
| Added Reactive Monomer | Styrene | 0.297 | 0.297 |
| Added Reactive Monomer | Divinyl Benzene | 0.297 | 0.297 |
| SCA | polyvinyl acetate | 4.660 | 4.660 |
| Additive | Calcium stearate (release agent) | 0.545 | 0.545 |
| Additive | Diisocyanate thickening agent | 2.001 | 2.001 |
| Additive - Conductive filler | Graphite powder A | 65.993 | 65.993 |
| | Graphite powder B | 9.063 | 9.063 |
| | Graphite powder C | 1.413 | 1.413 |
| Additive - Conductive fiber | Carbon fiber A | 1.472 | 1.472 |
| | Carbon fiber B | 0.156 | 0.156 |
| Curing | Inhibitor | 0.022 | 0.022 |
| Curing | Initiator | 0.222 | 0.222 |
| Total Graphene A content | | 0 | 1.02 |

Comp. = composition
SCA = shrinkage control additive

For each composition, the materials in Table 1 were compounded in a BMC mixer for 8-16 minutes. The BMC compositions were then compression molded into 12 in ×12 in×0.125 in (about 30.48 cm×30.48 cm×0.3175 cm) flat plaques at 150-200° C., wherein the cured flat plaques were then cut and machined into test bars.

BMC Composition Characterization. Physical and mechanical properties of the compositions of Table 1, and molded specimens made therefrom, were determined using the test methods described above in the section entitled "Test Methods". Tables 2-3 display the results of these measurements.

Table 2 displays physical properties for the two compositions. The density and shrinkage were very similar for both compositions. However, the thermal expansion and through-plane electrical conductivity for Composition 1 was greater than Comparative Composition 1. Adding 1.02 wt. % of Graphene A resulted in Composition 1 having an almost double through-plane electrical conductivity as Comparative Composition 1, and increasing its thermal conductivity by almost 3 W/m-K. Composition 1 was also less resistant to thermal expansion, particularly in the Z axis (27.72 ppm v. 11.28 ppm).

TABLE 2

Physical Properties of Compositions in Table 1

| Property | Method | Comparative Comp. 1 | Comp. 1 |
|---|---|---|---|
| Density (g/cm$^3$) | ASTM D792 | 1.826 | 1.834 |
| Shrinkage (in/in) | ASTM D955 | 0.00094 | 0.00076 |

TABLE 2-continued

Physical Properties of Compositions in Table 1

| Property | Method | Comparative Comp. 1 | Comp. 1 |
|---|---|---|---|
| CLTE, Z plane (ppm) | ASTM E831 | 27.72 | 11.28 |
| CLTE, X-Y plane (ppm) | ASTM E831 | 13.30 | 10.80 |
| Through-plane Electrical Conductivity (S/cm) | USFCC method | 53.3 | 103.4 |
| Through-plane Thermal Conductivity (w/m-K) | ASTM E1416 | 12.43 | 15.90 |

The through-plane electrical conductivity for Composition 1 is high enough to meet the DOE's target goals for bipolar plate, making Composition 1 an ideal composite for electrochemical devices such as fuel cells and chemical flow batteries. In addition to meeting the DOE's electrical conductivity target, a bipolar plate prepared using Composition 1 would retain its dimensions better than a plate prepared using Comparative Composition 1, as demonstrated by the lower shrinkage. This is important as bipolar plates need to maintain flatness and tight seals in fuel cell stacks.

Table 3 displays the mechanical properties measurements of each molded composition.

TABLE 3

Mechanical Properties of Compositions in Table 1

| Property | Method | Comparative Comp. 1 | Comp. 1 |
|---|---|---|---|
| Tensile Strength, N = 10 (PSI) | ASTM D638 | | |
| Mean | | 4,288 | 4,101 |
| Min | | 3,823 | 3,620 |

TABLE 3-continued

Mechanical Properties of Compositions in Table 1

| Property | Method | Comparative Comp. 1 | Comp. 1 |
|---|---|---|---|
| Max | | 4,776 | 4,458 |
| StdDev | | 323 | 311 |
| Tensile Modulus, N = 10 (PSI × 10$^6$) | ASTM D638 | | |
| Mean | | 2.32 | 2.57 |
| Min | | 1.92 | 2.00 |
| Max | | 2.73 | 2.22 |
| StdDev | | 262,080 | 280,085 |
| Tensile Elongation (strain), N = 10 (in) | ASTM D638 | | |
| Mean | | 0.0055 | 0.0045 |
| Min | | 0.0030 | 0.0021 |
| Max | | 0.0080 | 0.0058 |
| StdDev | | 0.0014 | 0.0011 |
| Flexural Strength, N = 10 (PSI) | ASTM D790 | | |
| Mean | | 6,174 | 5,986 |
| Min | | 5,442 | 5,047 |
| Max | | 6,934 | 6,515 |
| StdDev | | 492 | 488 |
| Flexural Modulus, N = 10 (PSI × 10$^6$) | ASTM D790 | | |
| Mean | | 1.80 | 2.09 |
| Min | | 1.47 | 1.93 |
| Max | | 1.95 | 2.18 |
| StdDev | | 154,238 | 1,857,691 |
| Compressive Strength, N = 80 (PSI) | ASTM D695 | | |
| Mean | | 9,973 | 9,537 |
| Min | | 9,659 | 9,094 |
| Max | | 10,235 | 9,756 |
| StdDev | | 191 | 196 |
| Notched Izod Impact N = 10 (ft*lb/in) | ASTM D256 | | |
| Mean | | 0.305 | 0.310 |
| StdDev | | 0.028 | 0.03 |

It was surprising that Composition 1 achieved a tensile strength, tensile modulus, tensile elongation, flexural strength and notched izod impact that were not significantly different from Comparative Composition 1, but the flexural modulus and compressive strength were considered significantly different. The addition of the graphene nanoplatelets were simply not expected to increase the flexural modulus while decreasing the compressive strength. Because of this unpredictable effect by the graphene nanoplatelets, Composition 1 resulted in a stiffer molded compound with a slightly lower compressive strength than the specimen formed by Comparative Composition 1.

Overall, the addition of 1.02 wt. % of graphene nanoplatelets did not greatly change the mechanical properties of Composition 1 when compared to Comparative Composition 1. However, the through-plane electrical conductivity of Composition 1 increased by almost 100% compared to Comparative Composition 1. Further, Composition 1 had a lower shrinkage from mold which will allow a molded component to retain its dimensions better, which is especially important in electrochemical devices that need to keep reactants separated.

The above example shows that it is possible to increase the through-plane electrical conductivity of BMCs by incorporating graphene nanoplatelets. In particular, this example showed that non-metallic, vinyl ester-based BMC thermoset compositions utilizing graphene nanoplatelets allowed for a material that mimics the electrical conductivity of metal-based materials while retaining the weight, shrinkage, strength, and moldability of known BMCs. This allows for the preparation of lightweight or thin components with increased durability, structural strength, and performance for electrochemical devices.

The following references are incorporated by reference in their entirety.

ASTM D256-10 (2018), Standard Test Methods for Determining the Izod Pendulum Impact Resistance of Plastics, ASTM International, West Conshohocken, PA, 2018, www.astm.org.

ASTM D638-14, Standard Test Method for Tensile Properties of Plastics, ASTM International, West Conshohocken, PA, 2014, www.astm.org.

ASTM D790-17, Standard Test Methods for Flexural Properties of Unreinforced and Reinforced Plastics and Electrical Insulating Materials, ASTM International, West Conshohocken, PA, 2017, www.astm.org.

ASTM D955-08, Standard Test Method of Measuring Shrinkage from Mold Dimensions of Thermoplastics, ASTM International, West Conshohocken, PA, 2014, www.astm.org.

ASTM D695-15, Standard Test Method for Compressive Properties of Rigid Plastics, ASTM International, West Conshohocken, PA, 2015, www.astm.org.

ASTM D732-17, Standard Test Method for Shear Strength of Plastics by Punch Tool, ASTM International, West Conshohocken, PA, 2017, www.astm.org.

ASTM D792-19, Standard Test Methods for Density and Specific Gravity (Relative Density) of Plastics by Displacement, ASTM International, West Conshohocken, PA, 2019, www.astm.org.

ASTM E831-19, Standard Test Method for Linear Thermal Expansion of Solid Materials by Thermomechanical Analysis, ASTM International, West Conshohocken, PA, 2019, www.astm.org.

ASTM E1461-13, Standard Test Method for Thermal Diffusivity by the Flash Method, ASTM International, West Conshohocken, PA, 2013, www.astm.org.

US Fuel Cell Counsel's protocol entitled "Through-plane electrical conductivity testing protocol for composite materials", Document No. 05-160, Jan. 13, 2004.

What is claimed is:

1. A bulk molding compound (BMC) composition comprising:
   a) a vinyl ester resin system;
   b) a curing package;
   c) an additive package;
   d) graphene nanoplatelets present in an amount that is greater than 0 to about 2 wt. %, based on the total weight of the BMC composition; and,
   e) one or more conductive fillers, wherein said one or more conductive fillers is a mixture of graphite particles having small particles sizes between 30 and 60 microns and large particle sizes above 120 microns.

2. The BMC composition of claim 1, wherein a through-plane electrical conductivity of the BMC composition is at least 20% greater than the same BMC composition without the graphene nanoplatelets.

3. The BMC composition of claim 1, wherein a through-plane electrical conductivity of the BMC composition is about 100% greater than the same BMC composition without the graphene nanoplatelets.

4. The BMC composition of claim 1, wherein said vinyl ester resin system comprises at least two vinyl ester resins, a shrinkage control additive, at least one reactive diluent monomer for diluting said at least two vinyl ester resins and said shrinkage control additive, and at least one added reactive monomer.

5. The BMC composition of claim 1, wherein said curing package comprises at least one initiator and at least one inhibitor.

6. The BMC composition of claim 1, wherein said additive package comprises one or more conductive fibers, an internal mold release agent and a thickening agent.

7. A bulk molding compound (BMC) composition comprising:
   a) a vinyl ester resin system, wherein said vinyl ester resin system comprises
      i) at least two vinyl ester resins,
      ii) a shrinkage control additive
      iii) at least one reactive diluent monomer for diluting said at least two vinyl ester resin and said shrinkage control additive, wherein the at least one reactive diluent monomer is selected from a group consisting of styrene, p-ethylstyrene, α-methylstyrene, vinyl toluene, divinyl benzene, methyl methacrylate, and ethylene glycol diacrylate,
   b) a curing package, wherein said curing package comprises at least one initiator;
   c) an additive package, wherein said additive package comprises at least one conductive filler, at least one conductive fiber, an internal mold release agent and a thickening agent; and,
   d) graphene nanoplatelets present in an amount that is greater than 0 to about 2 wt. %, based on the total weight of the BMC composition.

8. The BMC composition of claim 7, wherein said at least two vinyl ester resin are bisphenol A epoxy-based vinyl ester resins, and said shrinkage control additive is polyvinyl acetate.

9. The BMC composition of claim 7, wherein said conductive filler is a mixture of graphite particles having small particles sizes between 30 and 60 microns and large particle sizes above 120 microns, said conductive fiber is a mixture of milled and chopped carbon fibers, said internal mold release agent is calcium stearate, and said thickening agent is methylene diphenyl diisocyanate.

10. The BMC composition of claim 7, wherein said graphene nanoplatelets have an average platelet size between about 1 and about 25 microns.

11. A bipolar plate for use in an electrochemical cell comprising an electrically conductive plate molded from a vinyl ester-based bulk molding compound (BMC) composition of claim 7, wherein the electrical conductivity of the bipolar plate is about 96 to about 110 S/cm.

12. A bipolar plate according to claim 11, wherein said graphene nanoplatelet has an average platelet size between about 1 and about 25 microns.

13. A bipolar plate according to claim 11, said bipolar plate having a flexural strength of at least 34 mPa, and a mold shrinkage between about 0.00025 to about 0.00085 in/in.

* * * * *